US012330296B2

(12) United States Patent
Arruda

(10) Patent No.: US 12,330,296 B2
(45) Date of Patent: Jun. 17, 2025

(54) FOLDABLE MOVABLE UNIT FOR TREATMENT OF PRODUCTS

(71) Applicant: SIDEL CANADA INC., Laval (CA)

(72) Inventor: Paulo Alexandre Arruda, Laval (CA)

(73) Assignee: SIDEL CANADA INC., Laval (CA)

( * ) Notice: Subject to any disclaimer, the term of this patent is extended or adjusted under 35 U.S.C. 154(b) by 0 days.

(21) Appl. No.: 18/023,800

(22) PCT Filed: Sep. 3, 2021

(86) PCT No.: PCT/IB2021/058052
§ 371 (c)(1),
(2) Date: Feb. 28, 2023

(87) PCT Pub. No.: WO2022/049528
PCT Pub. Date: Mar. 10, 2022

(65) Prior Publication Data
US 2023/0311348 A1    Oct. 5, 2023

Related U.S. Application Data

(60) Provisional application No. 63/073,978, filed on Sep. 3, 2020.

(51) Int. Cl.
*B25J 21/00*     (2006.01)
*A47B 46/00*     (2006.01)
(Continued)

(52) U.S. Cl.
CPC ............. *B25J 21/00* (2013.01); *A47B 46/00* (2013.01); *A47B 51/00* (2013.01); *A47B 81/00* (2013.01);
(Continued)

(58) Field of Classification Search
CPC .......... B25J 21/00; B25J 9/1687; B25J 19/06; A47B 46/00; A47B 51/00; A47B 81/00; F16P 3/14; F16P 1/02; B65G 47/90
See application file for complete search history.

(56) References Cited

U.S. PATENT DOCUMENTS 6,163,946 A * 12/2000 Pryor ..................... B25J 9/1697
29/702
2010/0072184 A1* 3/2010 Osicki .................... B23K 9/173
219/136

(Continued)

FOREIGN PATENT DOCUMENTS

JP         2012030350 A  *  2/2012  ............... B23P 21/00
WO   WO-2013068830 A1  *  5/2013  ......... B23K 37/0294

OTHER PUBLICATIONS

International Search Report dated Dec. 22, 2021 for PCT/IB2021/058052.

*Primary Examiner* — Tan Le
(74) *Attorney, Agent, or Firm* — Blake T. Hudson

(57) ABSTRACT

Provided herein is a foldable movable device for the treatment of products. The device includes a structure having a base, a framework and panels, where the framework is upwardly fixed to the base and the panels being mounted to the framework. The device further includes an automation, fixed to the structure, that comprises a robotic arm and a tool, fixed at the robotic arm, that is suitable for gripping the products. The panels are articulately mounted on the framework, in order to be moved from a folded configuration of the device to a deployed configuration, and reversely.

13 Claims, 4 Drawing Sheets

(51) Int. Cl.
*A47B 51/00* (2006.01)
*A47B 81/00* (2006.01)
*B25J 9/16* (2006.01)
*B25J 19/06* (2006.01)
*F16P 1/00* (2006.01)
*F16P 3/14* (2006.01)

(52) U.S. Cl.
CPC ............. *B25J 9/1687* (2013.01); *B25J 19/06* (2013.01); *F16P 1/00* (2013.01); *F16P 3/14* (2013.01)

(56) References Cited

U.S. PATENT DOCUMENTS

2013/0119039 A1* 5/2013 Osicki ...................... B23K 9/16
  219/136
2017/0361472 A1* 12/2017 Padova .................. G09B 25/02

* cited by examiner

FOLDABLE MOVABLE UNIT FOR TREATMENT OF PRODUCTS

CROSS-REFERENCE TO RELATED APPLICATIONS

This application is the 35 U.S.C. § 371 national stage of PCT application having serial number PCT/IB2021/058052, filed on Sep. 3, 2021. This application also claims priority to U.S. provisional application having Ser. No. 63/073,978 filed on Sep. 3, 2020, each of which are entirely incorporated herein by reference.

FIELD OF INVENTION

The present invention relates to a foldable movable device for the treatment of products.

BACKGROUND ART

Automatic handling of products, such as a group or placed into a crate, is operated by an automation commanding a gripping tool suitable to seize the products. Such gripping tool can be, for example, suction means, such as one or several suction cups. The automation also commands the movements of the gripping tool during loading, unloading and transfer phases of the products. As known, such automation comprises a multi-axis robot, also called robotic arm, including several articulated motorized sections, in order to allow the movements of a distal end of the robotic arm in a three-dimensional space. The gripping tool is so attached to the distal end. Moreover, the robot is controlled by a command unit, especially a computer unit, wherein suitable software is configured and executed in order to manage all features of the robotic arm, especially the movements of the gripping tool, relative to the kind or the number of products to handle, especially a group of products or a crate enclosing the products.

During production, the robotic arm is so moving into a delimited space, also called working area, wherein no operator is allowed to avoid any accident due to the fast and automatic movements of the robotic arm. The working area can be demarcated by zone displays placed on the floor, such as color bands or hatchings, so that such different flooring can be obviously visualized by an operator. However, such displays are not efficient to provide safety of operators.

A safer solution is to confine the robotic arm into an area protected by fences or walls, such as translucid or transparent walls, in order to allow an operator to see and to supervise the robotic arm movements, without penetrating into its working area. A problem of an enclosure surrounding the working area consists in the permanent fixation of the fences or walls in the floor, at a dedicated place along the production line. If the robotic arm and the enclosure has to be moved from one place to another, it is then necessary to undo fixation of the walls and redo the fixation elsewhere. Such replace operation wastes much time. So the enclosure and the robotic arm are not regularly moved from a place to another along the production line.

SUMMARY OF INVENTION

An object of the present invention is to improve a device for treatment of products which is movable and can be easily replace along the line of production of said products.

Moreover in order to maintain a maximum safety around the working area, the movable device comprises an enclosure which is foldable. So the device can be quickly deployed at a moved place, then folded in order to replace it elsewhere along the production line, or eventually stocked into a folded configuration.

Therefore the foldable movable device according to the invention comprises a structure comprising a base, a framework and panels, the framework being upwardly fixed to the base, the panels being mounted to the framework, an automation comprising a robotic arm and a command unit of the robotic arm, the automation being fixed on the structure, and a tool suitable for gripping the products, said tool being fixed at a distal end of the robotic arm.

The panels are mounted on the framework, in order to be moved (articulated) from a folded configuration of the device to a deployed configuration, and reversely.

According to an embodiment, the panels comprises at least two side walls, each of the side walls being independently mobile according to a translation direction, the translation direction orthogonally extending laterally relative to the framework, in order to manage a part of a working area of the robotic arm on each side of the base in the deployed configuration of the device.

According to an embodiment, in the deployed configuration, each part of the working area is dimensioned between the side walls and the base to receive a pallet.

According to an embodiment, the side walls are slideably mounted on the framework.

According to an embodiment, the framework comprises guides fixed at a top and slides, the slides being mobile along the guides, one of the slides being fixed to an inner top edge of one of the side walls.

According to an embodiment, each of the side walls comprises wheel on an inner edge.

According to an embodiment, the panels comprises front walls, the front walls extending at a front side of the device between the framework and the side walls, the front walls being hinge-mounted on one lateral edge on the framework and on the other opposite lateral edge with the side walls.

According to an embodiment, the front walls form at least one door, the door being hinged-mounted on the framework or the side walls.

According to an embodiment, the front walls comprises on each lateral side of the base at least two right front walls and/or left front walls, the each of the right front walls and/or of the left front walls being able to articulated by way of a hinge to each other in such a way that each of the at least two right front walls and/or left front walls are, into the deployed configuration aligned and are extending orthogonally relative to the side walls, and into the folded configuration folded against each other and inwardly relative to the respective side walls.

According to an embodiment, the base is dimensioned to be handled by a pallet truck, into the folded configuration of the device.

According to an embodiment, a rear edge of the base comprises recesses suitable to receive forks of the pallet truck.

According to an embodiment, the device is an automatic palletizer of the products.

According to an embodiment, closings, each of the closings being mounted on the framework and is extending along a lateral side of the base between the base and each of the side walls, the closings being movable from a retracted position to a closed position, and reversely, in the closed position, the closings separates an inner area of the base and an outer area located between the base and the side walls.

According to an embodiment, each of the closings comprises a roller shutter, the roller shutter being mounted on a top part of the framework.

BRIEF DESCRIPTION OF THE DRAWINGS

The invention can be better understood on reading the following description given merely by way of example and with reference to the accompanying drawings, in which.

DESCRIPTION OF EMBODIMENTS

Figure 1:
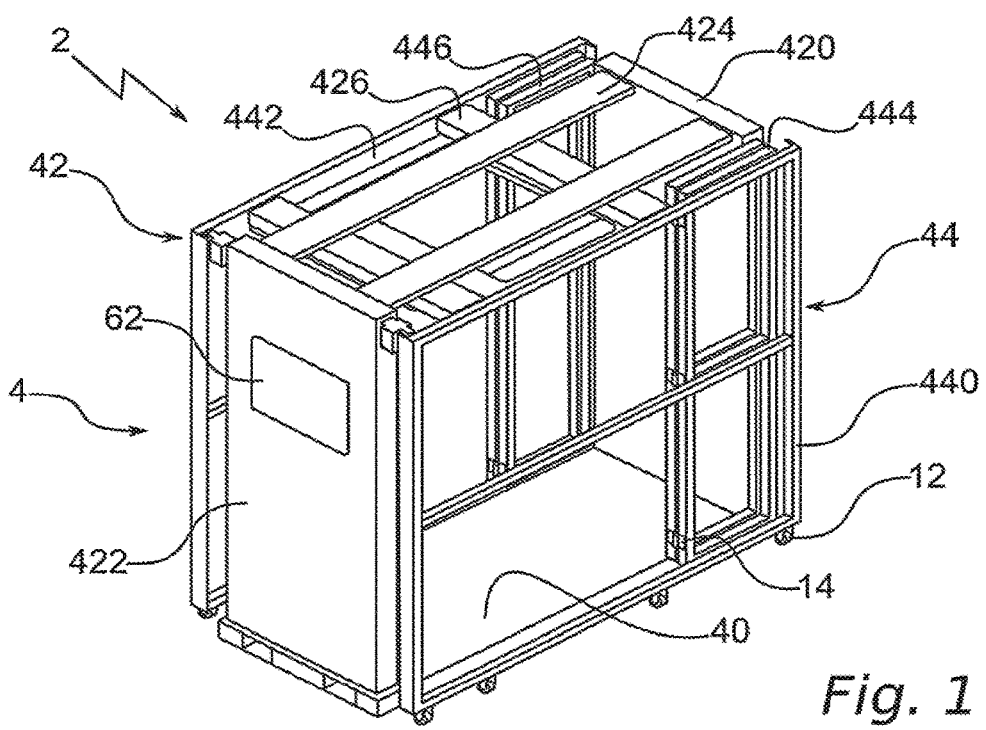
FIG. 1 is a diagrammatic perspective rear view of a side of a simplified embodiment of the foldable movable device into a folded configuration.

The present invention relates to the treatment of products along a line of production, especially operating the fabrication and the packaging of said products.

The invention relates to the field of the treatment of products along an industrial line of production of said products. Especially the invention aims the treatment of products such as the transport, the handling and the transfer of products from one unit or one conveyor of the industrial line to another unit or another conveyor.

According to the invention, such products are suitable containers for fluid, liquid or granule, even powder component. The component filling each product can be of a food type or of a cosmetic type, such as for health and personal care. Especially, the containers can be cans, bottles, flasks or bags. In the case of bottles or cans, the component can preferably be a drink or a beverage.

Moreover the products can be one container or several group containers. According to a first possibility, several containers can be grouped by a dedicated unit or conveyor upstream the production line. Then the treatment according to the invention consists in handling each group of products to transfer it to another downstream unit, such another conveyor, or to place each product group into a crate.

Another possibility according to the invention consists in products already placed into a crate, such as a cardboard box. The box is previously filled with products, closed and sealed by an upstream dedicated unit. Then the treatment according to the invention consists in handling each crate to transfer it to another downstream unit, such as another conveyor, or to successively stack several crates during a palletizing process.

According to an embodiment, the invention is limited to the automatic handling of products which are crated into boxes, such as a cardboard box, during a palletizing process.

According to the invention, the treatment of the products consists in transport, handling and transfer of said products from one unit or one conveyor of the industrial line and located upstream, to another unit or another conveyor located downstream. Moreover the products can be one container or several containers grouped to form a batch. A batch consists usually in a square group of products, especially six products, such as cans or bottles, the products being organized into rows and columns. According to a first possibility, several containers can be grouped into a batch by a dedicated unit or conveyor located upstream relative to the production line. Then the treatment according to the invention consists in handling each batch to transfer it to another downstream unit, such another conveyor, or to place each product group into a crate 1. Another possibility according to the invention consists in products already placed into a crate, such as a cardboard box. The crate 1 is previously filled with products, closed and sealed by an upstream dedicated unit. Then the treatment according to the invention consists in handling each crate 1 to transfer it to another downstream unit, such as another conveyor, or to successively stack several crates 1 during a palletizing process.

According to a preferred application, but not limited, the invention aims the automatic handling of products which are enclosed into crates 1, such as a cardboard box, during a palletizing process.

Thus the invention relates to a device 2 for the treatment of products, such as above mentioned.

So in the preferred application, but not limited, the device 2 is an automatic palletizer of the crates 1 filled with products.

According to the invention, the device 2 comprises a structure 4. Such structure 4 comprises a base 40, a framework 42 and panels 44.

The base 40 is suitable to lay on the ground and is dimensioned to allow a central stability of the device 2. According to an embodiment, the base 40 globally has a square and rectangular shape.

The framework 42 is upwardly fixed to the base 40. So the base 40 supports the framework 42. The framework 42 can be made of different parts, such as vertical frames and horizontal frames, especially horizontal top frames supported at the top of the vertical frames.

According to embodiments, such as shown in the figures, the framework 42 comprises a front vertical frame 420 and a rear vertical frame 422. The framework 42 also comprises horizontal frames 424. Such horizontal frames 424 are supported at their respective end by a top part of each of the vertical frames 420,422.

The panels 44 are mounted to the framework. 42. So the panels 44 can be mounted on the vertical frames 420,422 and/or the horizontal frames 424. According to an embodiment, each of the panels 44 are made of a peripheral structure. The structure of the panels 44 is supporting rigid plates, especially of a transparent or translucid material. So the panels 44 delimit an enclosure with the vertical frames 420,422, the enclosure extends almost along all the periphery in order to surround the device 2 and to manage an inner safe space, also called working area.

Thereby the device 2 also comprises an automation 6. The automation 6 is fixed on the structure 4. Such automation comprises a robotic arm 60 and a command unit 62 of the robotic arm 60.

The robotic arm 60 can be fixed on the base 40 of the structure 4 or mounted on the framework 42, especially mounted in an inverted way under the horizontal frames 424.

Moreover the robotic arm 60 can be of any type. According to a preferred embodiment, the robotic arm 60 is a multi-axis robot, including several articulated motorized sections, in order to allow the movements of a distal end 600 of the robotic arm 60 in a three-dimensional space.

The command unit 62 can be mounted on the base 40 of the structure or to the framework 42. the command unit 62 is especially incorporated into the rear vertical frame 422.

Moreover the command unit 62 comprises suitable computer and software mean, to control the movements of the robotic arm 60. The command unit 62 can also comprises an interface, like a screen, to allow an operator to interact and to supervise the operating of the device 2. Such interface can be located at the outer rear face of the rear vertical frame 422, so the operator can interact out of the working area of the device 2. Such interface can also comprise a remote part, included into a suitable wireless connected mobile device.

The automation 6 can also comprise suitable other mean, for example a power supply.

As aforementioned the device 2 aims the treatment such as the handling and the transfer of the products, especially products enclosed in a crate 1. Therefore, the device 2 comprises a tool 8 suitable for gripping the products and/or the crate 1. The tool 8 is fixed at the distal end 600 of the robotic arm 60. So when controlling the movements of the robotic arm 60, the gripping tool 8 can be moved in order to load, unload and transfer products.

According to an embodiment, the tool 8 comprises one or several suction cups 80. Several suction cups 80 can be located at a bottom face of the gripping tool 8, extending in a square way along rows and columns. Each suction cup 80 is suitable to handle one product or all the suction cups 80 are suitable to handle together a crate 1 filled with products, especially the top surface of a sealed crate 1.

According to the invention, the device 2 is movable, so that the entire device 2 can be easily quickly and easily relocated from one place to another along the production line. According to an embodiment, the base 40 is dimensioned to be handled by a pallet truck 20, into the folded configuration of the device 2. For example, a rear edge of the base 40 comprises recesses suitable to receive forks of the pallet truck 20. As another example, the front edge of the base 40 also comprises such recesses. So the base 40 of the device 2 allows the forks of the pallet truck 20 to insert therein and then the entire device 2 to be raised in order to move it from a place to another. Such raising of the device 2 by a motorized the pallet truck 20 is especially shown in FIG. 8. According to another embodiments, the pallet truck 20 can be semi-motorized or manually moved by an operator.

The device 2 is also foldable, in order to be moved from a folded configuration of the device 2 to a deployed configuration, and reversely. So when transporting the device 2 from a place to another, the device 2 is folded. Once located on a suitable place of the production line, the device 2 is deployed in order to manage a suitable space for a working area to handle the treatment of the products. The device 2 can also be folded in order to be placed into a storage area, when no more treatment is need. So when folded, the device 2 has a configuration as compact as possible.

Figure 2:
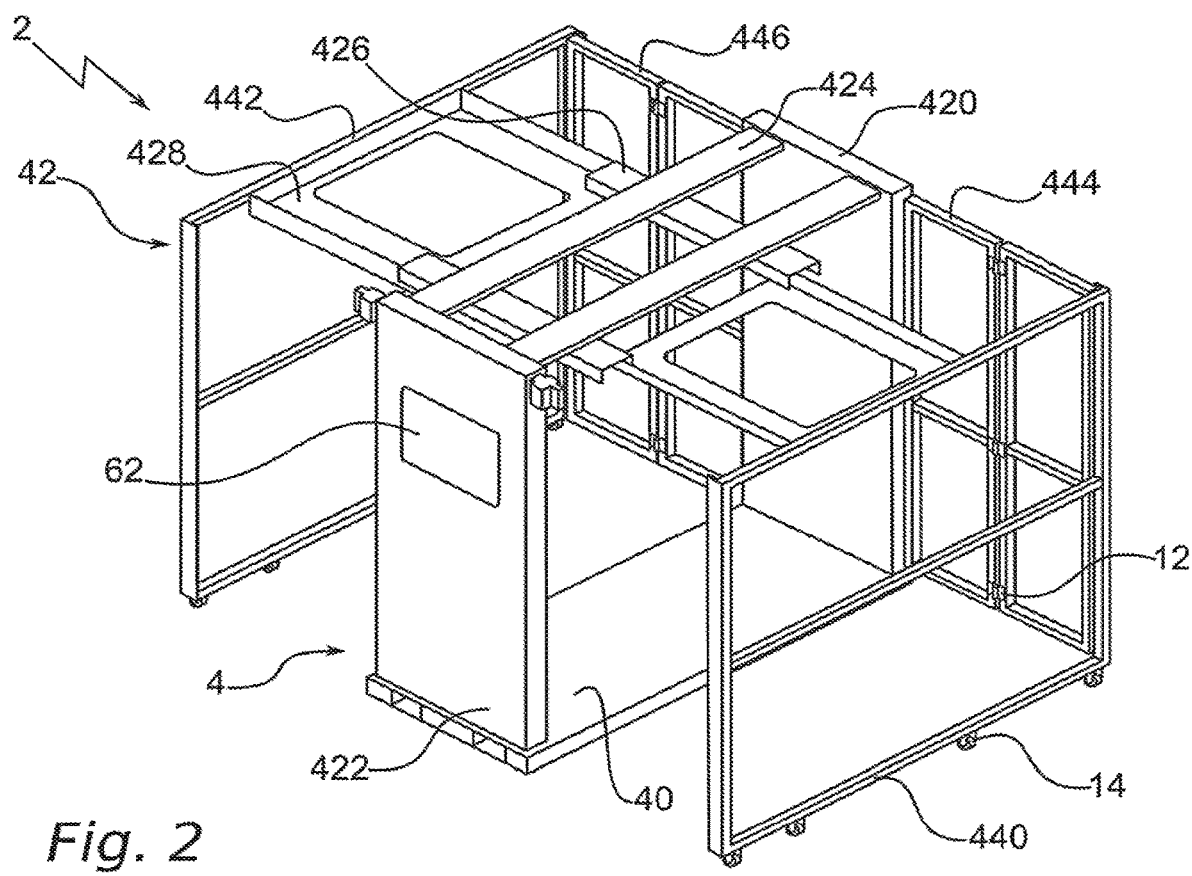
FIG. 2 is a diagrammatic perspective view similar to FIG. 1, wherein the foldable movable device is into a deployed configuration.
Figure 3:
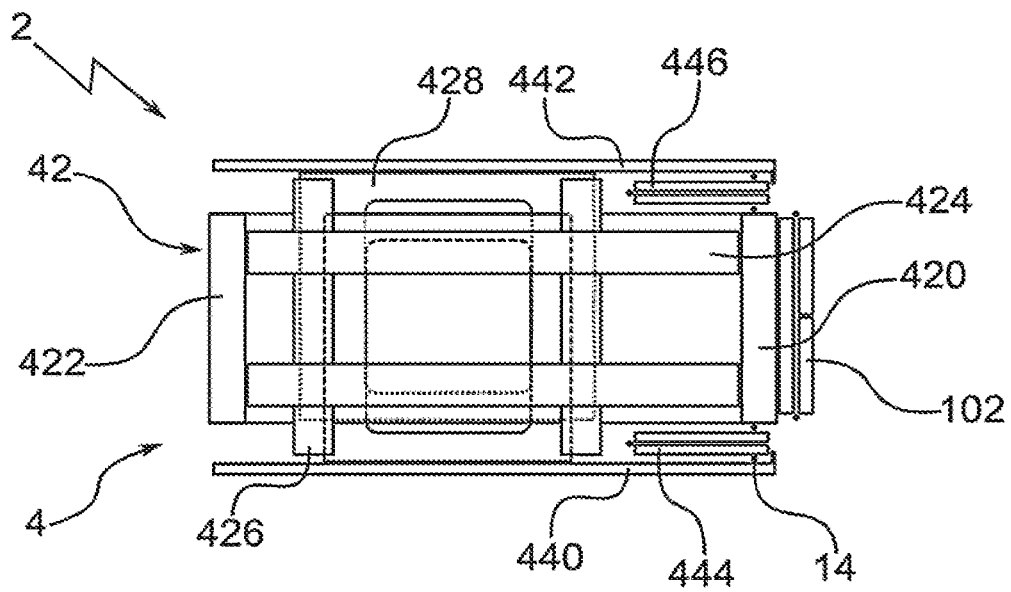
FIG. 3 is a diagrammatic elevation view of the FIG. 1.
Figure 4:
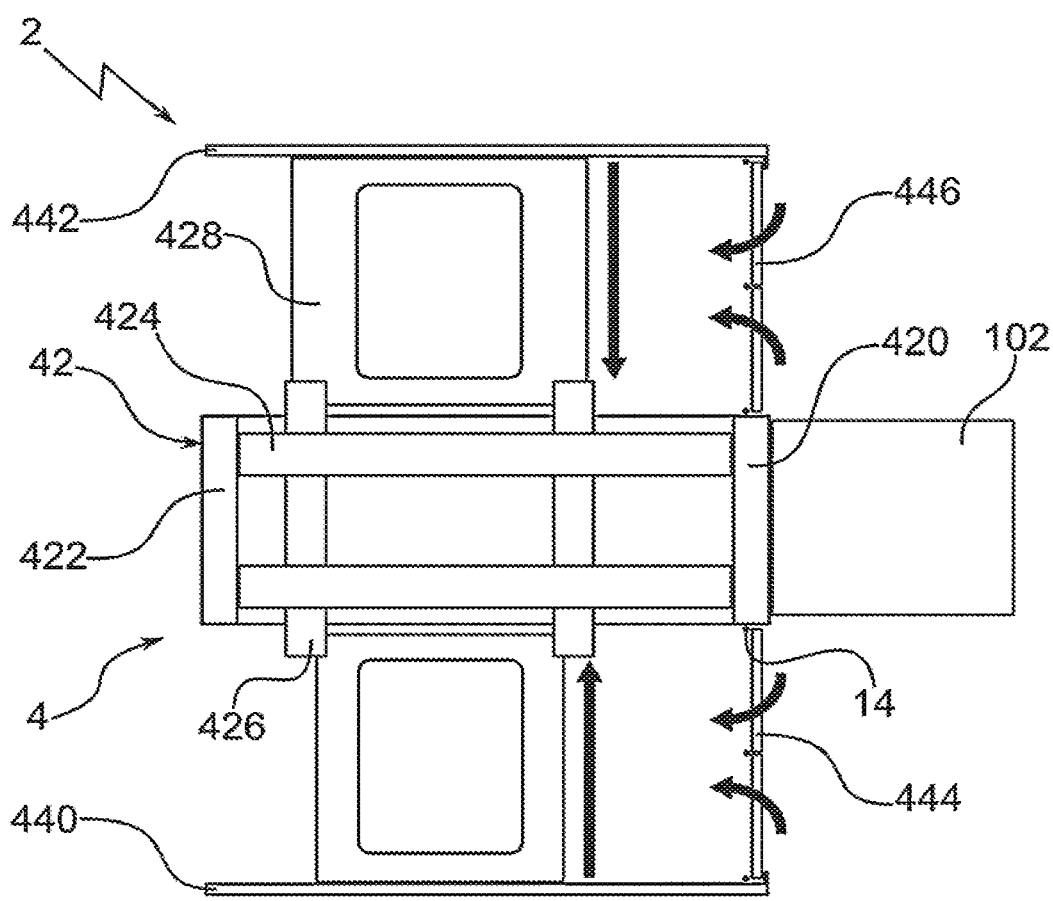
FIG. 4 is a diagrammatic elevation view of FIG. 2, especially showing folding direction of some enclosure walls.

Therefore according to an embodiment of the device 2, the panels 44 are articulately mounted on the framework 42, in order to be moved from the folded configuration of the device 2 to the deployed configuration, and reversely. The FIGS. 1 and 3 show the device 2 in the folded configuration, while the FIGS. 2 and 4 show the device 2 into the deployed configuration.

According to an embodiment, the panels 44 comprises at least two side walls. One of the side walls is located at right regarding the base 40, so called «right side wall 440», while another of the side walls is located at left, so called «left side wall 442». It is to be noticed that right and left is regarding along a direction extending from the rear to the front of the device 2.

Moreover each of the side walls 440,442 is independently mobile according to a translation direction. The translation direction orthogonally extends laterally relative to the framework 42, and so relative to the base 40. Such translation is especially represented by arrows in FIG. 4. The translation mobility of the side walls 400,442 manages a part of the working area of the robotic arm 60 on each side of the base 40 in the deployed configuration of the device 2.

Especially the whole working area comprises a middle part located over the base surface, where the robotic arm 60 is located, and two side parts located on the right side and the left side between the base 40 and each side walls 440,442, when the device 2 is in the deployed configuration. In the folded configuration these side parts of the working area are suppressed, so the working area is limited to the space over the base 40.

Moreover, as each of the side walls 440,442 can independently move, in the deployed configuration, the device 2 can only have one side part of the working area located at right or at left, or both the left and right side parts of the working area. According to an embodiment, in the deployed configuration, each side part of the working area is dimensioned between the side walls 440,442 and the base 40 to receive a pallet. Deployment of one or two side parts of the working area depends on the rate of the production line and the supply of products to the device 2.

This being, the device 2 is supplied with products by a suitable upstream unit of the production line, such as a conveyor. In order to receive the supplied products, the device 2 comprises an entry 10 located at a front side. Such entry 10 allows the products to enter the inner space of the device 2, in order to be handle by the robotic arm 60.

Figure 8:
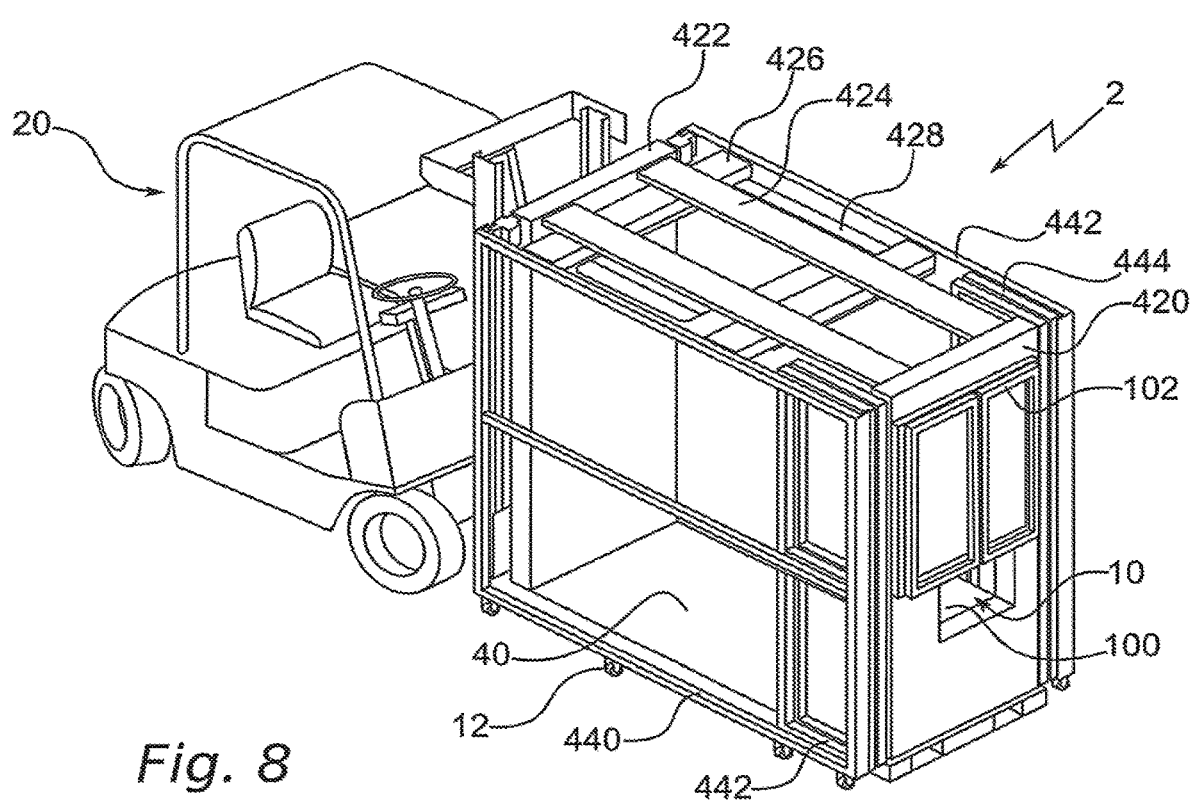
FIG. 8 perspective view of the front side similar to FIG. 1, showing the device in the folded configuration ready to be transported by a pallet truck.

According to an embodiment, such as shown in FIG. 8, the entry 10 is managed into the front vertical frame 420. The entry 10 is shaped as a through opening into the front vertical frame 420.

So when in production, the products are transported by a conveyor of the production line to the entry 10. Such production line conveyor is butted to and near the entry 10. Moreover the device can comprise an entry conveyor 100 to handle the products and to move them in order to cross the entry 10 and to enter into the working area, especially into the middle part of the working area. Such entry conveyor 100 can be of any type, especially a roller conveyor.

Figure 5:
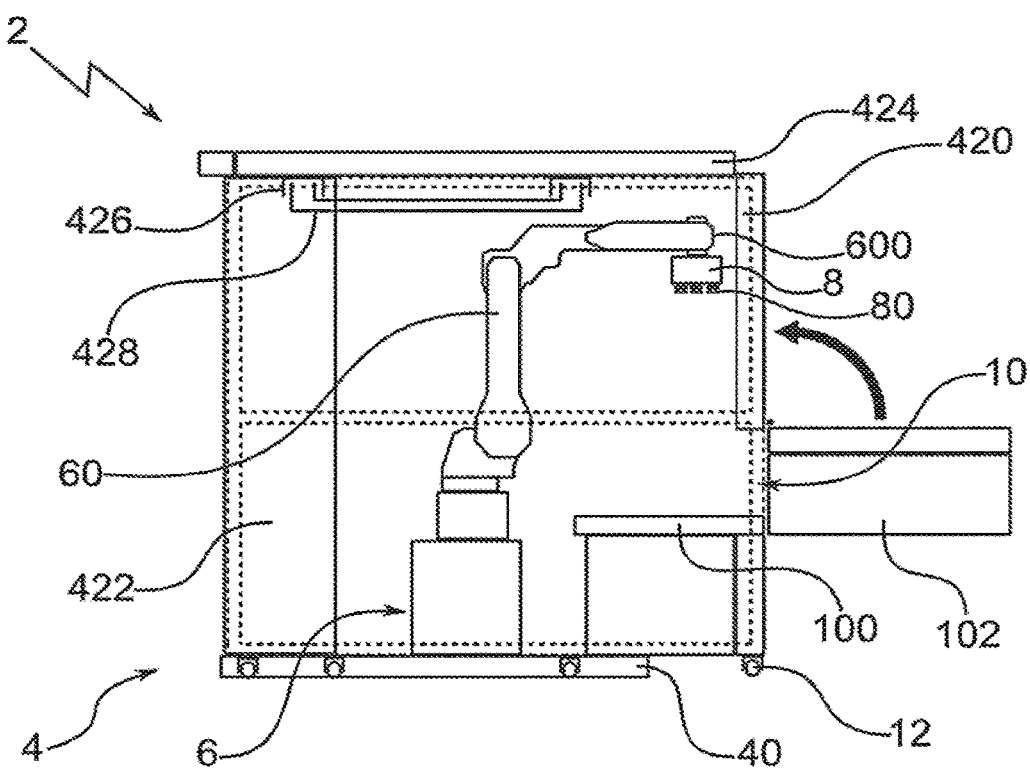
FIG. 5 is a diagrammatic lateral view of the inside of an embodiment of a device, especially showing a robotic arm and a gripping tool.
Figure 6:
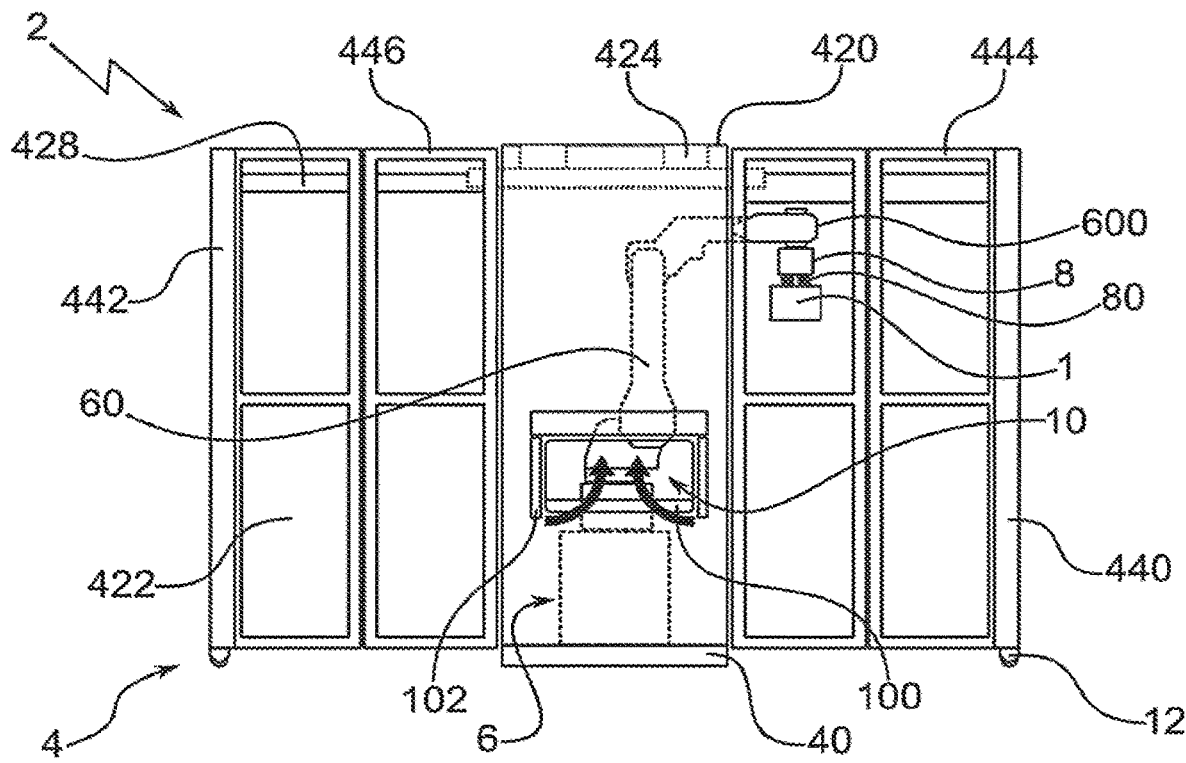
FIG. 6 is a diagrammatic front view similar to FIG. 5, wherein the device is in a folded configuration and wherein the gripping tool is loaded with a product as a crate, especially showing the robotic arm into a part of its working area.

According to an embodiment, in order to protect the entry 10, the device 2 comprises entry panels 102 which are also foldable from a retracted configuration to a unfolded configuration, and reversely. Into the retracted configuration, the entry panels 102 are folded along the front surface of the front vertical frame 420, such as especially shown in FIG. 8. Into the unfolded configuration, the entry panels 102 are deployed in order to manage a tunnel over and on both sides of the production line conveyor, such as especially shown in FIG. 5. Into the deployed configuration, the tunnel has a suitable length to avoid access to the entry 10, especially to avoid an operator to insert an arm or a hand into the working area.

According to an embodiment, the device 2 comprises safety sensors located on the tunnel, in order to detect any intrusion of an undesirable kind. So products are detected as allowed, while a body part of an operator is detected as not allowed and an emergency stop of the device 2 is automatically command, especially the stop of the robotic arm 60.

According to the preferred embodiment, the entry panels 102 comprise a top entry panel and two left and right entry panels. Moreover the top entry panel is hingedly articulated to the front vertical frame 420, while each of the left and right entry panels are hingedly articulated respectively to each of the left and right side of the top entry panel.

The device 2 also comprises suitable mean to secure the entry panels 102 into each configuration, especially to lock them into the retracted configuration.

According to an embodiment, the foldable way of the device 2 is acquired into the translation direction, so that each of the side walls 440,442 is moved away from the base 40, and reversely is moved closer. During this translation movement, the side walls 440,442 are moved in a parallel way or in an almost parallel way, relative to each lateral edge of the base 40. Such translation movement also extends horizontally or almost horizontally.

Therefore the side walls 440,442 are slideably mounted on the framework 42.

According to an embodiment, the framework 42 comprises guides 426 fixed at a top. he guides 426 can be fixed to the horizontal frames 424, especially mounted under a bottom face of each of the horizontal frames 424. Such guides 426 can have an inverted U shape section.

Moreover the framework 42 also comprises slides 428. The slides are mobile along the guides 426. So the slides 428 can be moved along the translation direction regarding the guides 426 which stay fixed relative to the framework 42. One of the slides 428 is also fixed to an inner top edge of one of the side walls 440,442. In other words, there are a right one of the slides 428 which is connected to the right-side wall 440 and a left one of the slides 428 which is connected to the left side wall 442. Each of the slides 428 can globally have a plate U shape. Such plate shape of the slides 428 can comprise an opening in the middle, such as especially shown in FIG. 4, in order to lighten the weight of the structure. One of the slides 428 is higher and larger to the other, in order to allow them to fit together when moved into the folded configuration.

According to the invention, the movement of the side walls 440,442 can be controlled manually by an operator or in a motorized way, especially thanks to suitable electric pistons.

According to an embodiment, in order to allow the translation of the side wall 440,442, they comprise wheels 12 on an inner edge. As shown in the embodiments represented in FIGS. 1,2 and 5, each of the side walls 440,442 comprises four wheels 12 fixed under its bottom edge, so that the side walls 440,442 lay on the ground thanks to the wheels 12.

According to an embodiment, in order to close the front opening into the deployed configuration, the panels 44 comprises front walls 444,446. The front walls 444,446 extend at a front side of the device 2 between the framework 42 and the side walls 440,442. The front walls 444,446 are hingedly mounted on one lateral edge on the framework 41 and on the other opposite lateral edge with the side walls 440,442. So at least one right front wall 444 is articulated to the right-side wall 440, while at least one left front wall 446 is articulated to the left side wall 442.

According to a preferred embodiment, the front walls comprises on each lateral side of the base 40 at least two right front walls 444 and/or left front walls 446. The each of the right front walls 444 and/or of the left front walls 446 are hingedly articulated to each other in such a way that each of the at least two right front walls 444 and/or left front walls 446 are, into the deployed, configuration aligned and are extending orthogonally relative to the side walls 440,441. Such deployed configuration is especially shown in FIGS. 2 and 4.

Then into the folded configuration, each pair of the right front walls 444 and/or of the left front walls 446 are folded against each other and inwardly relative to the respective side walls 440,442. So each pair of front walls 444,446 are folding like a bellow. Such folded configuration is especially shown in FIGS. 1 and 3.

Figure 7:
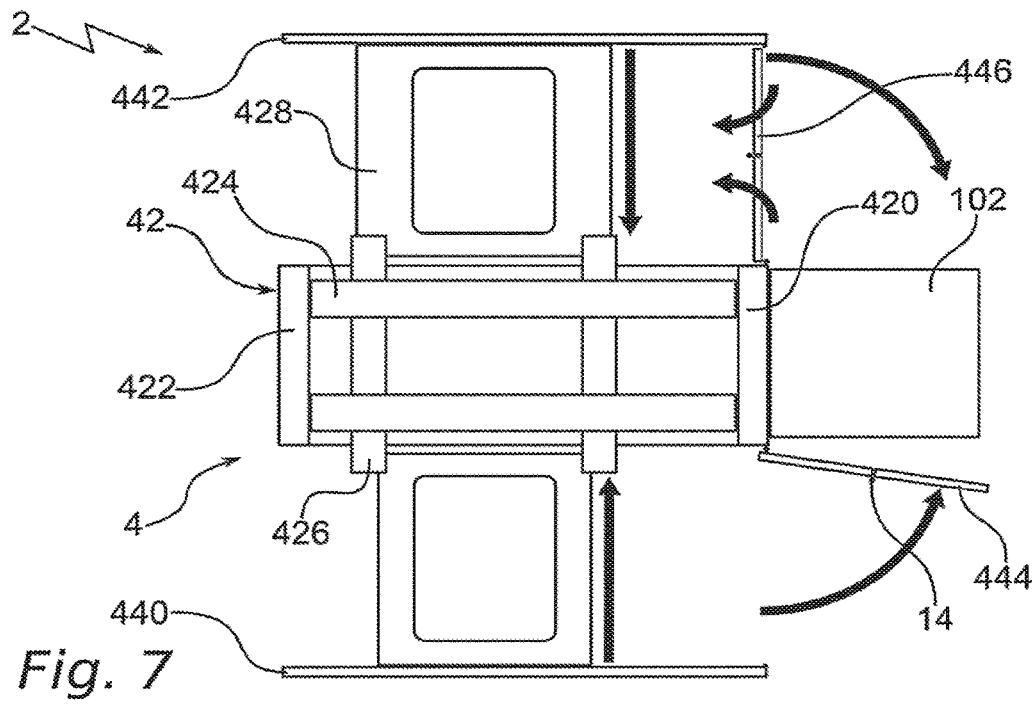
FIG. 7 is a diagrammatic elevation view of an embodiment of a device, especially showing front walls forming door.

According to another embodiment, the front walls 444, 446 form at least one door, each door being hingedly mounted on the framework 42 or the side walls 440,442. Moreover each door is articulated to outwardly open relative to the device 2. Especially the device 2 comprises a right door including the right front walls 444 and/or a left door including the left front walls 446. An example of such a device 2 with doors is represented in FIG. 7, wherein one right of the doors is in an open position to grant access from front of the device 2, while one left of the doors is in a closed position.

According to an embodiment, the articulation of the front walls 444,446 is obtained thanks to suitable hinges 14.

According to the invention, the rear space located at the opposite of the front walls 444,446 can remain opened, forming an access way, in order to allow an operator to enter each of the side parts of the working area.

In order to prevent any accident, the access way can be equipped with sensors, which detect any intrusion and send an emergency stop signal to the device 2, especially t the command unit 62.

According to an embodiment, the device 2 comprises closings. Each of the closings is mounted on the framework 42 and is extending along and regarding a lateral side of the base 40 between the base 40 and each of the side walls 440,442. So there are a right closing and a left closing. Moreover the closings are movable from a retracted position to a closed position, and reversely. In the closed position, the closings separate the inner area of the base 40 and an outer area located between the base 40 and the side walls 440,442. So each of the closings are cutting the working area into the previously mentioned parts.

Such closed position of one of the left or right closings allows an operator to safely enter into each lateral part of the working area in order to operate, especially to remove a complete stacked pallet or to introduce a new empty pallet. For example, when the operator has to remove a full pallet located at the right part of the working area, then the right closing is moved into the closed position and the robotic arm 60 is working within the left side, and reversely.

According to an embodiment, each of the closings comprises a roller shutter. The roller shutter is mounted on a top part of the framework 42. Especially the roller shutter can be mounted under the horizontal frame 424, in particular under the guides 426, in such a way to allow the movements of the slides 428. So with the closings, the sensors of the access way cannot be necessary anymore.

According to another embodiment, each of the right and/or left door access can be closed by rear doors. Such rear doors can be articulated as the front walls 444,446.

So the foldable movable device 2 according to the invention can be easily and quickly folded and deployed anywhere along the production line, in order to suit the real capacity of production. The device 2 offers a modular way through the possibility of deployment of one of the right or left side of the working area, and also of both of them.

The device 2 ensures a total safety of the operator, avoiding any intrusion by the enclosure surrounding the working area. If so, such intrusion is detected and the device 2 is stopped.

The invention claimed is:

1. A foldable movable device for treatment of products, comprising
   a structure comprising a base, a framework and panels, the framework being upwardly fixed to the base, the panels being mounted to the framework,
   an automation comprising a robotic arm and a command unit of the robotic arm, the automation being fixed on the structure,
   a tool suitable for gripping the products, said tool being fixed at a distal end of the robotic arm, wherein
   the panels are articulately mounted on the framework, in order to be moved from a folded configuration of the device to a deployed configuration, and reversely, wherein
   the panels comprise at least two side walls,
   each of the side walls is independently mobile according to a translation direction, the translation direction orthogonally extending laterally relative to the framework, in order to manage a part of a working area of the robotic arm on each side of the base in the deployed configuration of the device; and wherein
   in the deployed configuration, each part of the working area is dimensioned between the side walls and the base to receive a pallet.

2. The foldable movable device according to claim 1, wherein
   the side walls are slideably mounted on the framework.

3. The foldable movable device according to claim 2, wherein
   the framework comprises guides fixed at a top and slides, the slides being mobile along the guides,
   one of the slides being fixed to an inner top edge of one of the side walls.

4. The foldable movable device according to claim 1, wherein
   each of the side walls comprises wheel on an inner edge.

5. The foldable movable device according to claim 1, wherein
   the panels comprise front walls, the front walls extending at a front side of the device between the framework and the side walls,
   the front walls being hingedly mounted on one lateral edge on the framework and on the other opposite lateral edge with the side walls.

6. The foldable movable device according to claim 5, wherein
   the front walls form at least one door, the door being hingedly mounted on the framework or the side walls.

7. The foldable movable device according to claim 5, wherein
   the front walls comprises on each lateral side of the base at least two right front walls and/or left front walls, the each of the right front walls and/or of the left front walls being hingedly articulated to each other in such a way that each of the at least two right front walls and/or left front walls are, into the deployed configuration aligned and are extending orthogonally relative to the side walls, and into the folded configuration folded against each other and inwardly relative to the respective side walls.

8. The foldable movable device according to claim 1, wherein
   the base is dimensioned to be handled by a pallet truck, into the folded configuration of the device.

9. The foldable movable device according to claim 8, wherein
   a rear edge of the base comprises recesses suitable to receive forks of the pallet truck.

10. The foldable movable device according to claim 1, wherein
    the device is an automatic palletizer of the products.

11. The foldable movable device according to claim 1, further comprising
    closings, each of the closings being mounted on the framework and is extending along a lateral side of the base between the base and each of the side walls,
    the closings being movable from a retracted position to a closed position, and reversely,
    in the closed position, the closings separates an inner area of the base and an outer area located between the base and the side walls.

12. The foldable movable device according to claim 11, wherein
    each of the closings comprises a roller shutter, the roller shutter being mounted on a top part of the framework.

13. A foldable movable device for treatment of products, comprising
    a structure comprising a base, a framework and panels, the framework being upwardly fixed to the base, the panels being mounted to the framework,
    an automation comprising a robotic arm and a command unit of the robotic arm, the automation being fixed on the structure,
    a tool suitable for gripping the products, said tool being fixed at a distal end of the robotic arm, wherein
    the panels are articulately mounted on the framework, in order to be moved from a folded configuration of the device to a deployed configuration, and reversely; and wherein
    the device is an automated palletizer of the products treated thereon.

* * * * *